(12) United States Patent
Beisel et al.

(10) Patent No.: US 11,965,502 B2
(45) Date of Patent: Apr. 23, 2024

(54) LUBRICANT PUMP

(71) Applicant: SKF LUBRICATION SYSTEMS GERMANY GMBH, Walldorf (DE)

(72) Inventors: Daniel Beisel, Kronau (DE); Holger Schmidt, Klein-Machnow (DE); Dieter Schoenherr, Kleinbeeren (DE)

(73) Assignee: SKF LUBRICATION SYSTEMS GERMANY GMBH, Walldorf (DE)

( * ) Notice: Subject to any disclaimer, the term of this patent is extended or adjusted under 35 U.S.C. 154(b) by 340 days.

(21) Appl. No.: 17/385,328

(22) Filed: Jul. 26, 2021

(65) Prior Publication Data

US 2022/0056903 A1 Feb. 24, 2022

(30) Foreign Application Priority Data

Aug. 18, 2020 (DE) .......................... 102020210480.8

(51) Int. Cl.
*F04B 53/06* (2006.01)
*F04B 53/16* (2006.01)
*F04B 53/22* (2006.01)
*F16N 13/00* (2006.01)

(52) U.S. Cl.
CPC .............. *F04B 53/06* (2013.01); *F04B 53/16* (2013.01); *F04B 53/22* (2013.01); *F16N 13/00* (2013.01); *F16N 2260/00* (2013.01)

(58) Field of Classification Search
CPC ........... F04B 53/06; F16N 19/00; F16N 13/00

USPC ..................................................... 417/423.14
See application file for complete search history.

(56) References Cited

U.S. PATENT DOCUMENTS

| 2,387,233 | A | * | 10/1945 | Clapp | ..................... F04B 53/06 222/189.1 |
| 7,313,956 | B1 | * | 1/2008 | Murphy, Sr. | ............. F16N 29/04 73/313 |
| 9,855,574 | B2 | * | 1/2018 | Beisel | ...................... F16N 11/10 |
| 2014/0212313 | A1 | * | 7/2014 | Jager | ....................... F04D 9/003 417/423.14 |
| 2016/0312777 | A1 | * | 10/2016 | Kreutzkaemper | ...... F16N 11/10 |
| 2017/0021374 | A1 | * | 1/2017 | Beisel | ..................... F16N 11/10 |
| 2022/0056903 | A1 | * | 2/2022 | Beisel | ..................... F16N 13/00 |

* cited by examiner

*Primary Examiner* — Michael A Riegelman
(74) *Attorney, Agent, or Firm* — J-TEK LAW PLLC; Scott T. Wakeman; Mark A. Ussai

(57) ABSTRACT

A housing for a lubricant supply device for supplying a consumer with a lubricant includes a storage space for the viscous medium and a pump space configured to contain a conveying pump for pumping the viscous medium from the storage space to a medium outlet. The storage space is at least partially defined by a side wall, a base wall and a cover wall, and the supply device also includes an outer wall overlying a portion of the storage space side wall and defining with the storage space side wall a first intermediate space. The storage space side wall includes a first opening providing fluid communication between the storage space and the intermediate space.

20 Claims, 6 Drawing Sheets

LUBRICANT PUMP

CROSS-REFERENCE

This application claims priority to German patent application no. 10 2020 210 480.8 filed on Aug. 18, 2020, the contents of which are fully incorporated herein by reference.

TECHNOLOGICAL FIELD

The present disclosure is directed to a housing for a supply device for supplying a consumer with a viscous medium, and, more specifically, to a housing of a lubricant supply device, as well as to the lubricant supply device having the housing.

BACKGROUND

In existing lubricant pumps that have a lubricant reservoir, in order to avoid forming an under- or over-pressure during emptying or filling of the reservoir, venting elements are usually provided that connect the lubricant reservoir to an external environment. As a rule such venting elements are fixedly attached to the container. They are generally embodied such that a labyrinthine design prevents foreign bodies or moisture from outside from entering the container.

However, it is very difficult to impossible to clean the labyrinth or remove the foreign bodies, especially when the foreign bodies include insects that nest in the venting element, such as when the venting element is used outdoors. In addition, when a venting element is attached externally to the container this produces to a spatial structure on the container and enlarges the container in at least one direction. This can possibly interfere with an installation of the lubricant pump and cause damage or be subjected to damage.

SUMMARY

An aspect of the present disclosure is therefore to provide a lubricant pump including a venting device that improves the above-mentioned disadvantages.

In the following a housing is provided for a supply device for supplying a consumer with a viscous medium, in particular a lubricant, which supply device is configured to form at least one storage space for the viscous medium and to receive a conveying pump to pump the viscous medium from the storage space to a medium outlet.

Since such a supply device is primarily used for the distribution of lubricants as a viscous medium, in the following the term "lubricant" is used analogously to "viscous medium." Of course, other viscous media are nonetheless also usable.

In order to provide a venting device that is neither structurally applied nor damageable, the housing includes at least one storage space side wall, a storage space base wall, and a storage space cover wall that define a storage space for the medium, and at least partially includes a storage space outer wall that surrounds the storage space side wall spaced with respect to the storage space side wall and forms a first intermediate space. The housing is thereby configured double-wall at least sectionally.

Furthermore, at least one first opening is provided in the storage space side wall, which first opening fluidically connects the storage space of the housing to the first intermediate space. This openings allows for a certain air exchange to occur in the storage space itself so that a venting is possible in order to prevent an under or over pressure in the storage space.

This is necessary in particular in supply devices in which the lubricant is pumped from a closed storage space under pressure, where the stock of the lubricant decreases during pump operation. Since the storage space is closed or the pump includes a so-called follower plate that separates the lubricant region from an air region in the storage space, the space must be vented above the lubricant level and inside the storage space or above the follower plate, since otherwise with the pump operating and the lubricant level decreasing an under-pressure would form that adversely influences the pumping function. The same applies during the filling or refilling of the storage space, wherein air must escape from the storage space so that filling is possible at all. In addition, the venting device also allows lubricant to escape from the storage space in case of an overfilling of the storage space so that the housing can be prevented from bursting. Furthermore, it is ensured by the double-walled nature of the housing that the venting device, and thus also the housing, cannot be damaged.

According to a further preferred exemplary embodiment, the first intermediate space is at least partially closed by a cover wall and/or base wall, wherein preferably the storage space cover wall and/or the storage space base wall at least partially close the first intermediate space. It can thereby be ensured that contaminants cannot enter into the intermediate space.

Such a housing for a lubricant pump is usually manufactured as an injection-molded element, which in one-piece manufacturing includes all or a plurality of the walls described here above and below.

According to a further advantageous exemplary embodiment, the housing furthermore includes a pump space side wall, a pump space base wall, and a pump space cover wall which define a pump-receiving space for receiving the conveying pump, and furthermore at least partially includes a pump space outer wall that surrounds the pump space side wall spaced with respect thereto and forms a second intermediate space, wherein the pump-receiving space and the storage space are preferably disposed with respect to each other such that the first and the second intermediate space form a continuous intermediate space. A housing appearing to be one-piece is thereby provided that can be present as a prefabricated component.

In most lubricant pumps, the housing is configured two-part and includes a pump space and a storage space. Pump elements can thereby be installed and maintained without the entire housing having to be emptied or removed.

The second intermediate space is preferably also at least partially closed by a cover wall and/or base wall, wherein the pump space cover wall and/or the pump space base wall preferably at least partially close the second intermediate space. As also with the storage space, the integral design using the pump space base wall or pump space cover wall has the advantage that the housing is easy to manufacture.

According to a further exemplary embodiment, the pump space side wall and the storage space side wall are configured one-piece, and the storage space outer wall and the pump space outer wall are configured one-piece, so that the first and the second intermediate space form a continuous intermediate space. Furthermore, the storage space base wall preferably forms the pump space cover wall. A housing is thereby provided that includes as few individual parts as possible.

According to a further exemplary embodiment, the continuous intermediate space is also at least partially closed by a cover wall and/or base wall, wherein the storage space cover wall and/or the pump space base wall preferably at least partially close the continuous intermediate space.

According to a further exemplary embodiment, the housing includes at least one further opening that fluidically connects the first, second, or continuous intermediate space to the external environment, so that a venting device is provided via the intermediate space, via which the storage space is in air-exchange contact with the external environment. Furthermore, if the intermediate space is covered as described above by a cover wall or base wall, it can also be ensured that the intermediate space is protected from an ingress of foreign bodies, but an air exchange with the external environment can simultaneously take place, so that the storage space remains pressure compensated.

It is advantageous in particular here when at least one of the at least one further openings is formed in the base wall of the housing, which base wall at least partially closes the first, second, or continuous intermediate space. Due to the design of the opening in a lower region, in particular in the region of the base wall, it can furthermore be insured that lubricant that could enter into the intermediate space during an overfilling of the storage container can be discharged from the intermediate space without an expensive cleaning being required. Due to the arrangement of the further opening in the base wall, lubricant can simply flow away out of the intermediate space. In addition, a venting device open downward protects particularly well against contamination.

In order to keep the intermediate space as free from lubricant as possible, even in the event of an overfilling of the storage space, i.e., in the event of an escape of lubricant from the storage space into the intermediate space, it is furthermore preferred to introduce a tubular, preferably replaceable, element into the intermediate space, which element fluidically connects the first opening to the further opening formed in the base wall. Lubricant that enters into the intermediate space during an overfilling can be guided by the tubular element from the intermediate space without the walls of the intermediate space being contaminated with lubricant. Since the tubular element is preferably replaceable, it can also be insured that a hygienically flawless housing can be provided. An accumulation of old lubricant, e.g., as a result of overfilling, can be prevented by removing and cleaning or replacing the tubular element.

Here it is preferred to introduce the tubular element into the intermediate space via the further opening formed in the base wall, wherein in particular the opening in the base wall is equipped with an attachment structure, for example, a screw thread or a bayonet coupling, which interacts with a complementary attachment structure, in particular a complementary screw thread or bayonet coupling, that is formed on the tubular element, in order to hold the tubular element in the intermediate space. It is thereby ensured on the one hand that the tubular element remains in the intermediate space and on the housing, and on the other hand is also oriented in its position, so that the fluidic connection between first opening and tubular element is ensured even when the lubricant pump is subjected to mechanical loads, such as, for example, impacts or inclined positions.

According to a further advantageous exemplary embodiment, at least one of the at least one further openings in the outer wall is preferably formed opposite to the first opening, so that the first opening and the second opening in the outer wall form a through-opening through the storage space outer wall and storage space side wall. This is advantageous in particular with injection-molded housings, since via the through-opening a tool specific opening can easily be formed in the storage space side wall.

In order to prevent an undesirable entry of foreign bodies via the second opening provided in the outer wall, it is furthermore provided that a closure element is insertable in the opening, which closure element is configured to close the opening in the outer wall, but simultaneously to leave open the opening to the storage space side wall.

Here an exemplary embodiment is preferred in particular wherein the closure element is configured to close the through-opening through the storage space outer wall and the storage space side wall, and is configured as a closed hollow body, preferably as a hollow cylinder, which includes a first and a second closure-element opening, wherein the first closure-element opening is fluidically oriented toward the first opening, and the second closure-element opening fluidically interacts with the intermediate space, in particular the tubular element, so that the closure element is furthermore configured to form a fluidic connection between the first opening and the intermediate space or the tubular element. It can thereby be ensured that lubricant is guided directly from the first opening into the tubular element or the intermediate space without running down against the side wall in the intermediate space. This also contributes to the hygienic basic design of the housing.

Instead of a further element, it can of course also be provided that the tubular element has an elbowed design on one end, which elbowed design interacts with the first opening. Via, for example, the above-mentioned bayonet coupling, a directional orientation of the tubular element toward the first opening can additionally be made possible. Of course, other designs are equally possible, such as, for example, markings between the tubular element and the housing that indicate that the tubular element is disposed in the corresponding correct position for a fluidic connection.

According to a further advantageous exemplary embodiment, the closure element is furthermore rotatably and/or releasably attached in the outer wall. Alternatively or additionally the closure element can also be inserted into the opening in a plurality of defined positions. Here in particular it is preferred if the closure element can be brought from a first position, wherein a fluidic connection is made possible between the first opening and the intermediate space or the tubular element, to a second position wherein a fluidic connection is prevented between the first opening and the intermediate space or the tubular element. Here the attaching itself can be effected, for example, via screwing-in or also via press seat. In addition, markings or corresponding latch positions (e.g., via bayonet coupling) can in turn be provided that define a corresponding orientation of the closure element in the through-opening.

A further aspect of the present invention relates to a lubricant supply device including such a housing.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
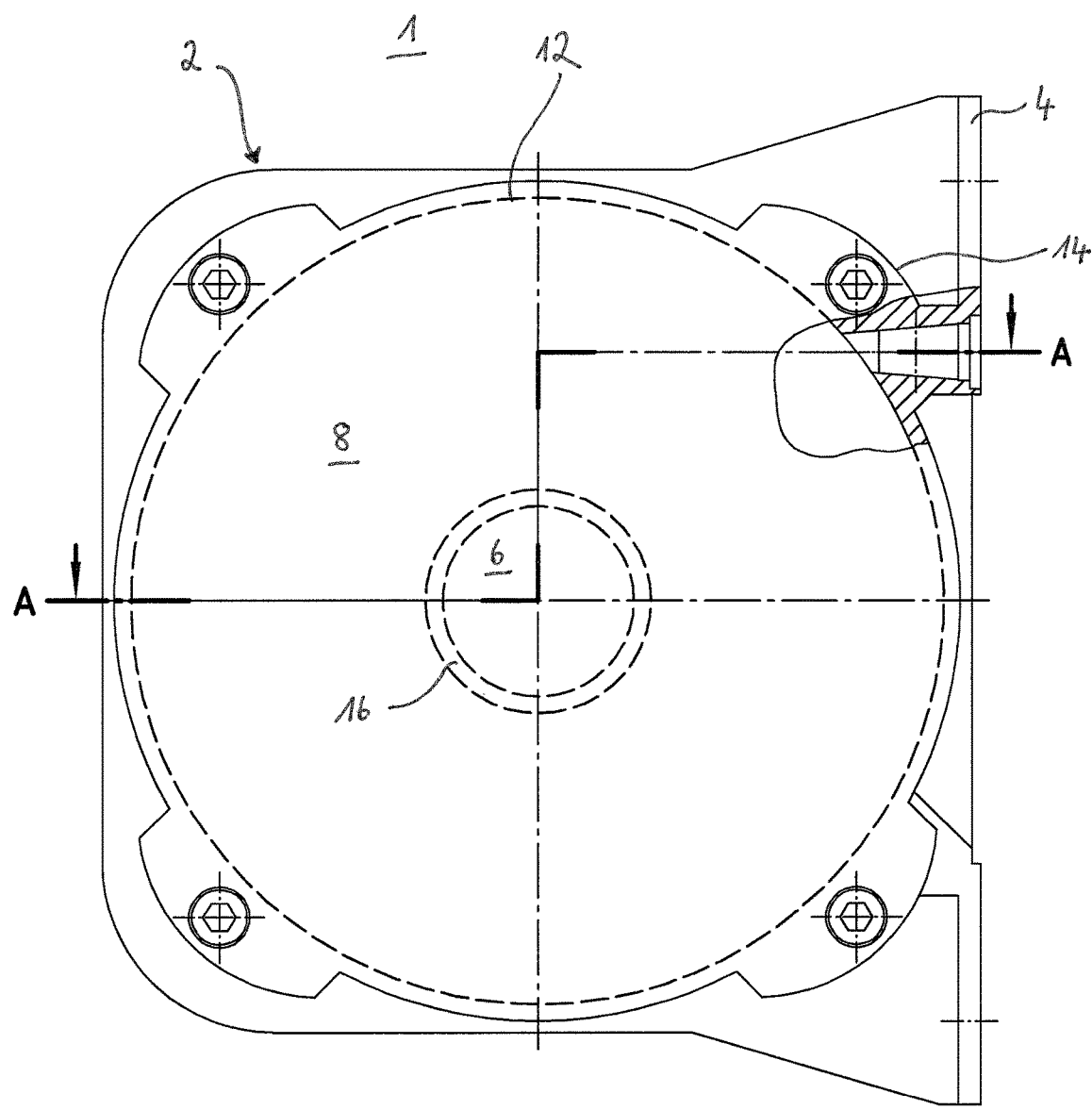
FIG. 1 is a schematic bottom view of a first exemplary embodiment of a housing for a lubricant supply device.
Figure 2:
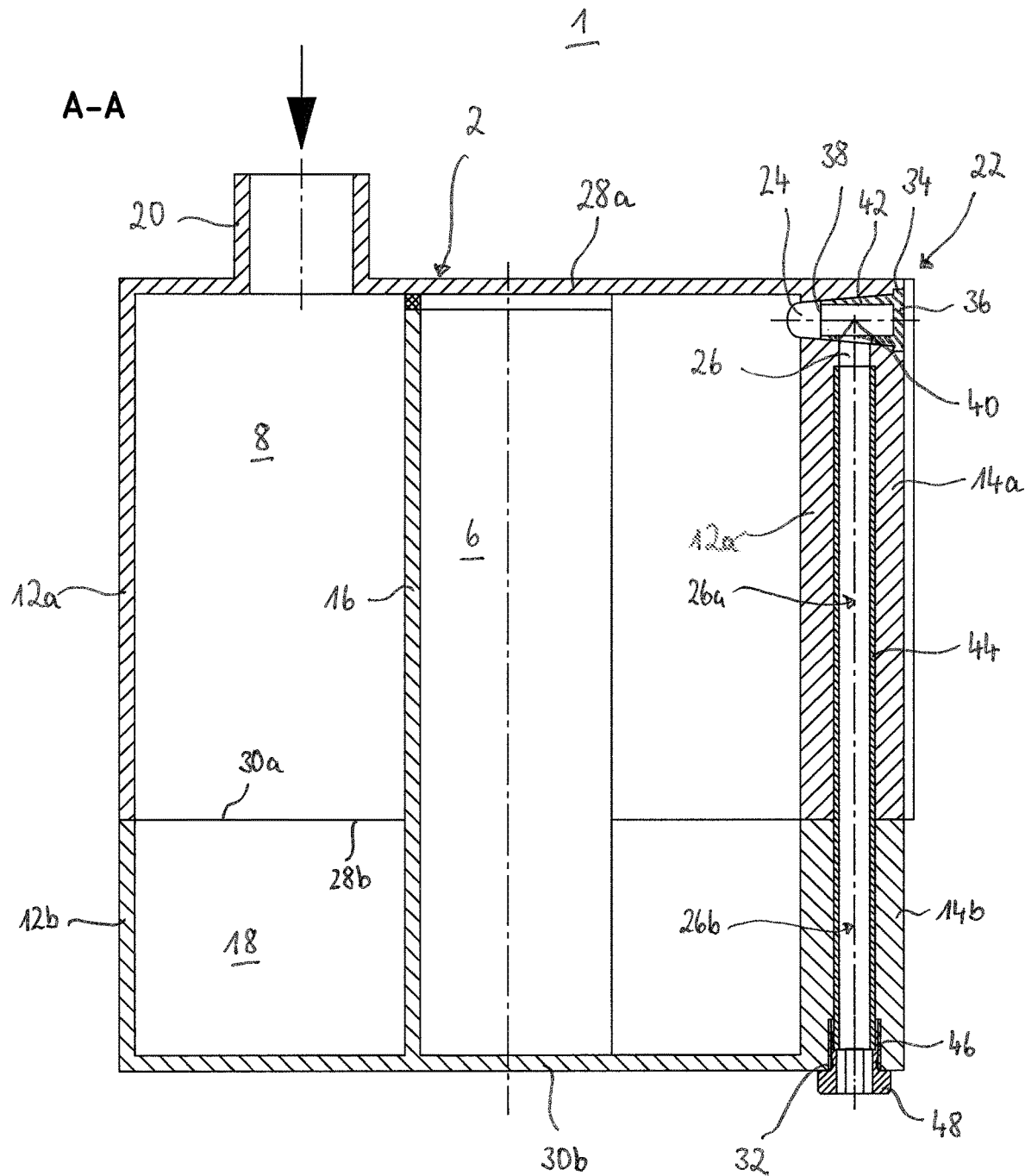
FIG. 2 is a sectional view through the housing depicted in FIG. 1 in a first state.
Figure 3:
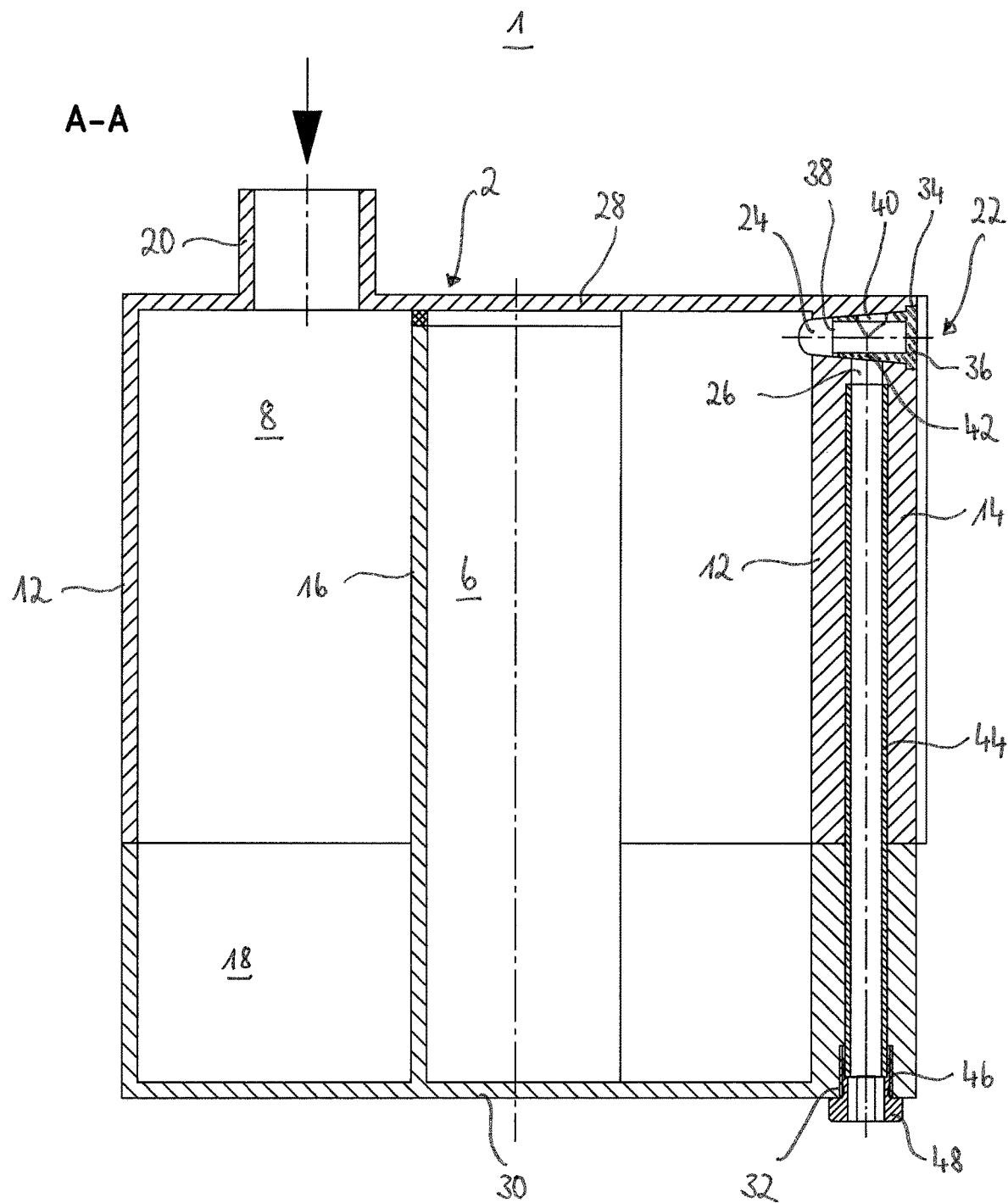
FIG. 3 is a sectional view through the housing depicted in FIG. 1 in a second state.

FIGS. 1 to 3 show a first exemplary embodiment of a preferred housing 2 of a lubricant pump 1. Here FIG. 1 shows a bottom view of the lubricant pump 1, while FIGS. 2 and 3 each show sectional views. The lubricant pump 1 includes a housing 2 that is laterally equipped with a flange element 4, using which the housing 2 is attachable to, for example, a wall. Furthermore, FIG. 1 and, better, FIGS. 2 and 3, show that the housing 2 depicted here of the lubricant pump 1 is the housing of a lubricant pump including an internal motor. For this purpose the housing includes a region 6 wherein the motor (not depicted) for operating the lubricant pump is disposed. This region 6 is separated from a lubricant-receiving storage space 8 via a wall 16. As can be seen from FIGS. 2 and 3, the storage space 8 is defined/enclosed by a storage space side wall 12a, a storage space cover wall 28a, and a storage space base wall 30a.

Furthermore, FIGS. 2 and 3 show that the housing 2 includes a pump-receiving space 18 lying below the storage space 8, which pump-receiving space 18 is configured to receive, for example, drive components and pump elements of the pump (not depicted). None of the further pump elements are depicted in the Figures. The pump-receiving space 18 is also defined/enclosed via the pump space side wall 12b, a pump space cover wall 28b, and a storage space base wall 30b. In the exemplary embodiment depicted here, the pump space cover wall 28b is formed by the storage space base wall 30a. Furthermore, the side walls 12a, 12b can be configured one-piece (as two portions of the same wall) and are referred to in the following as side wall 12.

It can be seen from FIG. 1, but more precisely from FIGS. 2 and 3, that the housing 2 is configured at least partially double-wall, and in particular includes a storage space outer wall 14a or a pump space outer wall 14b, which can also be configured one-piece and are referred to in the following as outer wall 14. As can be seen in in particular from FIGS. 2 and 3, the side wall 12 and the outer wall 14 are disposed spaced from each other and thus form an intermediate space 26. In a two-part design of the housing, the intermediate space 26 is divided into a first intermediate space 26a that is associated with the storage space, and a second intermediate space 26b that is associated with the pump space, wherein, however, the two housing parts are disposed with respect to each other such that the first and the second intermediate space 26a, 26b form a continuous intermediate space 26.

Furthermore, as can be seen from FIGS. 2 and 3, the storage space cover wall 28a is configured such that it also closes the intermediate space 26 with respect to the external environment, and in the base region the pump space base wall 30b at least partially closes the intermediate space with respect to the external environment. Thus the storage space cover wall 28a is simultaneously the cover wall 28 for the housing, and the pump space base wall 30b is the base wall 30 for the housing.

In the exemplary embodiment depicted in FIGS. 1 to 3, the housing or the storage space is fillable with lubricant via a nozzle 20 formed in the storage space cover wall 28a. This occurs, for example, by lubricant being pumped under pressure into the connection nozzle 20. In order to allow a pressure compensation in the storage space 8 without the filling process having to be stopped, a venting device 22 is furthermore provided in the container 2, which venting device 22 is provided via an opening 24 in the side wall 12 in the embodiment depicted. This first opening 24 in the side wall 12 is formed in a region wherein the lubricant container 2 is double-walled, so that the opening 24 fluidically connects the storage space 8 to the intermediate space 26.

Furthermore, it can be seen in FIGS. 2 and 3 that the cover wall 28 of the housing 2 extends over the intermediate space 26 and closes it from above. The base wall 30 also extends over the intermediate space 26 and at least partially closes it with respect to an external environment. In order to nonetheless make possible a venting via the intermediate space, an opening 32 is furthermore provided in the exemplary embodiment depicted, which opening 32 fluidically connects the intermediate space 26 to the external environment.

Furthermore, FIGS. 2 and 3 show that a further opening 34 is formed in the outer wall 14, which opening 34 is aligned with the opening 24 as a through-opening. Since such housings 2 are often manufactured one-piece from injection molding or in the injection-molded method, an opening through the outer wall 14 and the side wall 12 is required for the forming of the opening 24. Even if a venting via this opening 34 would be directly possible, it is nevertheless preferred to close it with a closure element 36, in order to thus make possible a fluidic connection between storage space 8 and intermediate space 26, but to close the outer environment with respect to the intermediate space 26. A venting directly via the opening 34 would namely make possible a too-easy access to the storage space, so that, for example, insects or vermin could directly reach the storage space.

The closure element 36 itself can be cylindrical and include a first closure-element opening 38 and a second closure-element opening 40, wherein the first closure element opening 38 interacts with the first opening 24, while the second closure element opening 40 can provide a fluidic transition between the intermediate space 26 and the storage space 8. For this purpose the closure element 36 can be rotated or correspondingly inserted in a first position (see FIG. 2), wherein a fluidic connection is possible between the opening 40 and the intermediate space 26, or is brought into a closed position depicted in FIG. 3, wherein a fluidic connection between the storage space 8 and the intermediate space 26 is blocked via a wall element 42 (outer surface). It is thereby made possible that during a filling, the closure element 36 is rotated or correspondingly inserted in the first position (see FIG. 2), and makes possible a fluid connection between the storage space 8 and the intermediate space 26 via the first opening 24, the first closure opening 38, and the second closure opening 40. Excess air or excess lubricant is then channeled from the storage space 8 via the opening 24 and the intermediate space 26 toward the opening 32 present in the base plate. An overpressure or an over-filling can thus be prevented.

In operation, the closure element 36 can then be rotated into the position depicted in FIG. 3, so that lubricant cannot unintentionally escape via the opening 24 and the intermediate space 26. In order to avoid a buildup of underpressure in the storage space 8, air is usually supplied via the filling nozzle 20. Alternatively a venting can of course also occur in operation via the intermediate space 26. In this case the closure element 36 is not rotated into the second position (FIG. 3), but rather remains in the first position shown in FIG. 2. This is advantageous in particular when after the filling, the filling nozzle 20 is closed in an air-tight manner using a cover element.

In the event of a filling wherein an air supply (venting) remains possible via the filling nozzle 20 even during the filling process, e.g., during the infusion of lubricant, the closure element can of course be in the closed position shown in FIG. 3 even during the filling. If required (e.g., air-tight closing of the filling nozzle 20 by a cover element after the filling), the closure element 36 can in turn be rotated after the filling into the open position shown in FIG. 2, whereby in operation a venting is then in turn possible via the intermediate space 26.

In order to provide particularly hygienic conditions and to prevent lubricant, which, for example, can escape from the storage space 8 during an overfilling and can enter into the intermediate space 26, from accumulating in the intermediate space 26 and aging there or contaminating the housing, it is furthermore preferred to insert a tubular element 44 into the intermediate space 26, which tubular element 44 can guide the excess lubricant or air toward the opening 32. The tubular element 44 is preferably releasably disposed in the intermediate space 26 and oriented during the filling toward the second closure element opening 40. A spatial orientation of the closure element 36 can be achieved via corresponding markings on the housing or latch positions.

In order to hold and spatially fix the tubular element 44 in the intermediate space, an attachment structure 46 is provided in the opening 32 in the base element 30, which attachment structure 46 interacts with an attachment structure on the tubular element 44. For example, the attachment structures 46, 48 can be configured as screw threads as depicted in FIGS. 2 and 3. The tubular element 44 can thereby simply be screwed into the intermediate space 26. Of course, other attachment elements are equally possible for the tubular element 44 and also the closure element 36. Thus, for example, a bayonet coupling or a simple press seat can be equally used. Alternatively the tubular element itself can also include no attachment structure and be held in the intermediate space using a separate screw element that interacts with the attachment structure 46. In this case the screw element includes a through-hole so that a venting is made possible.

Figure 4:
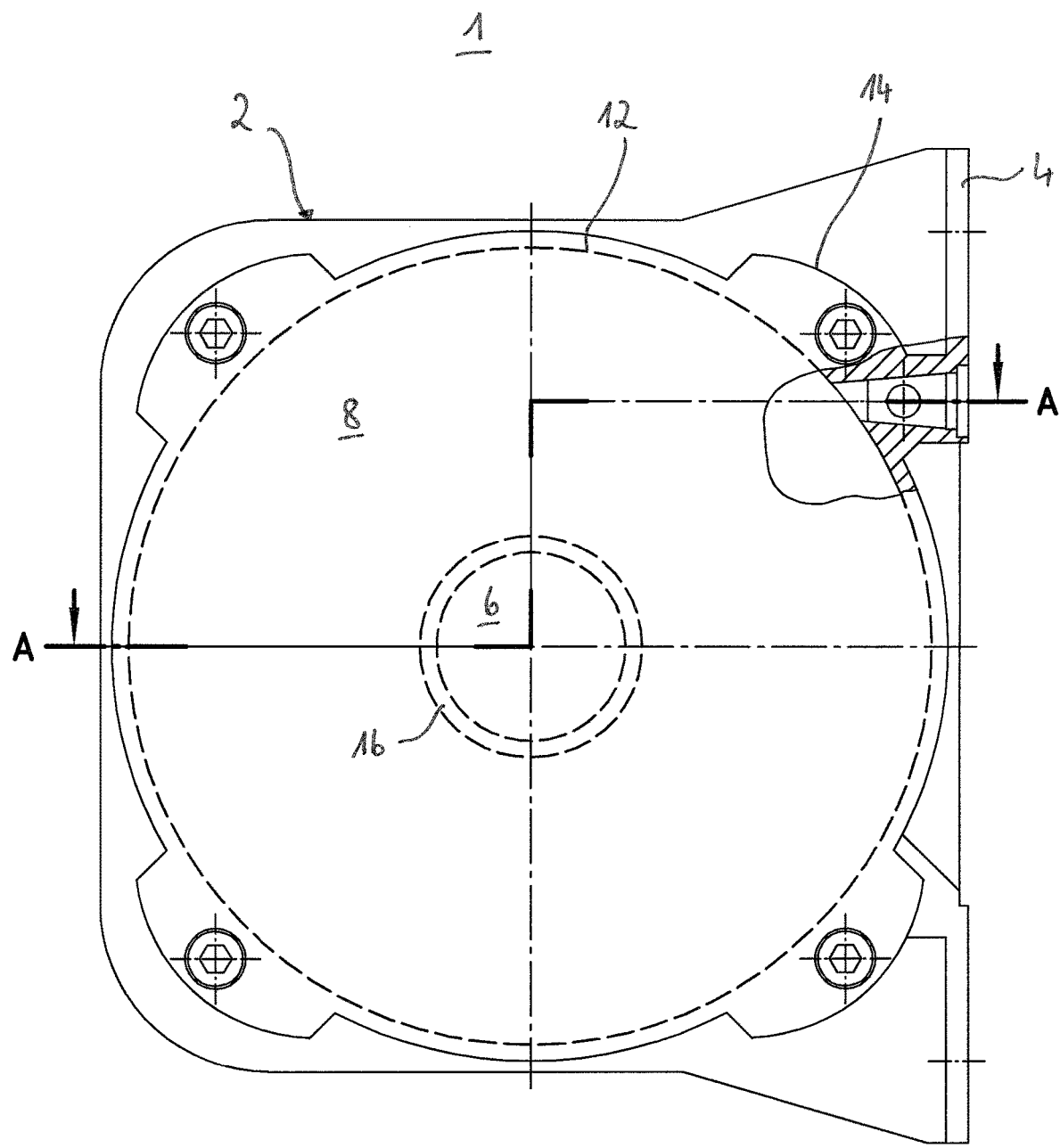
FIG. 4 is a bottom view of an exemplary embodiment of a housing.
Figure 5:
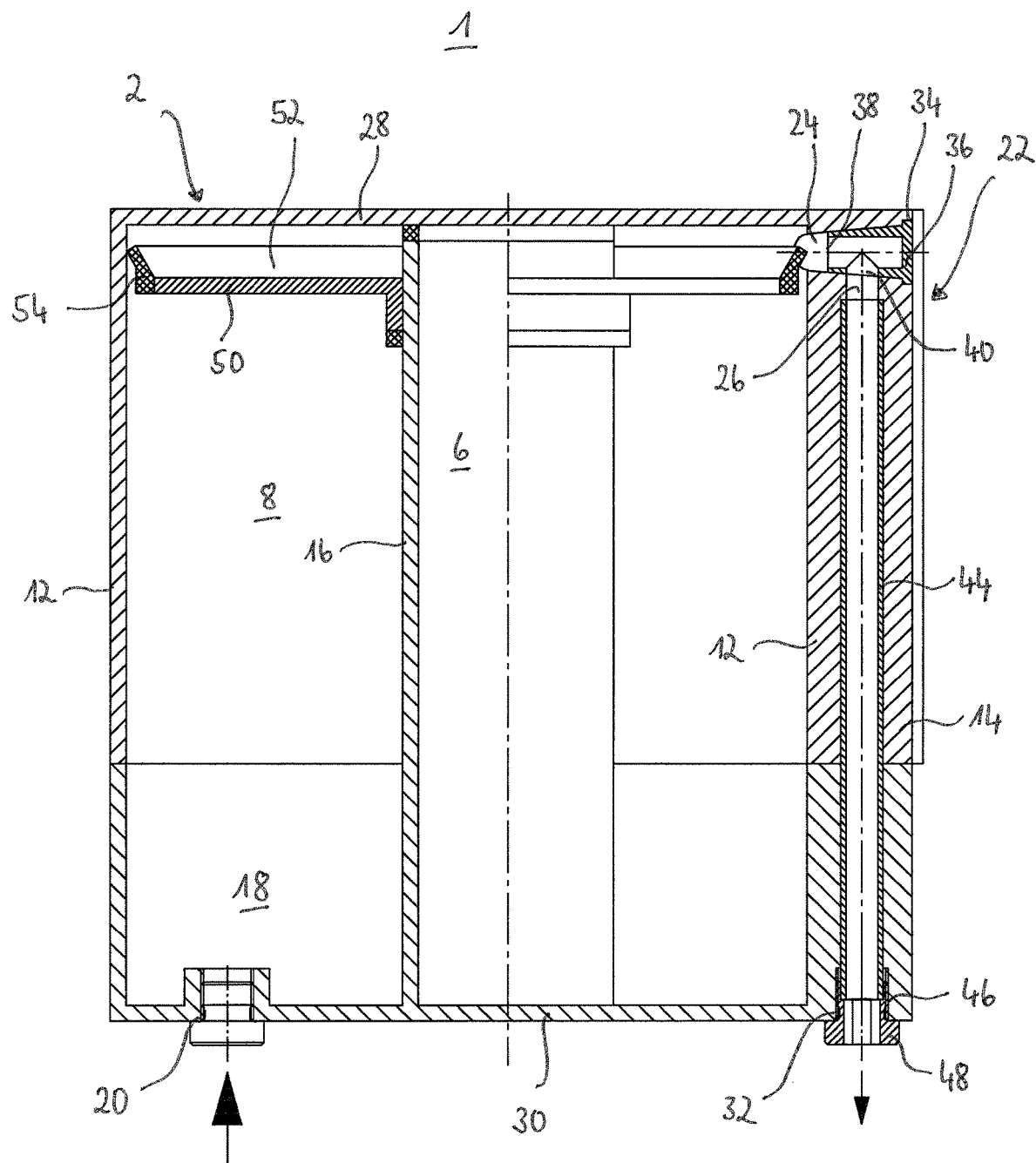
FIG. 5 is a sectional view through housing of FIG. 4 in a first filling state.
Figure 6:
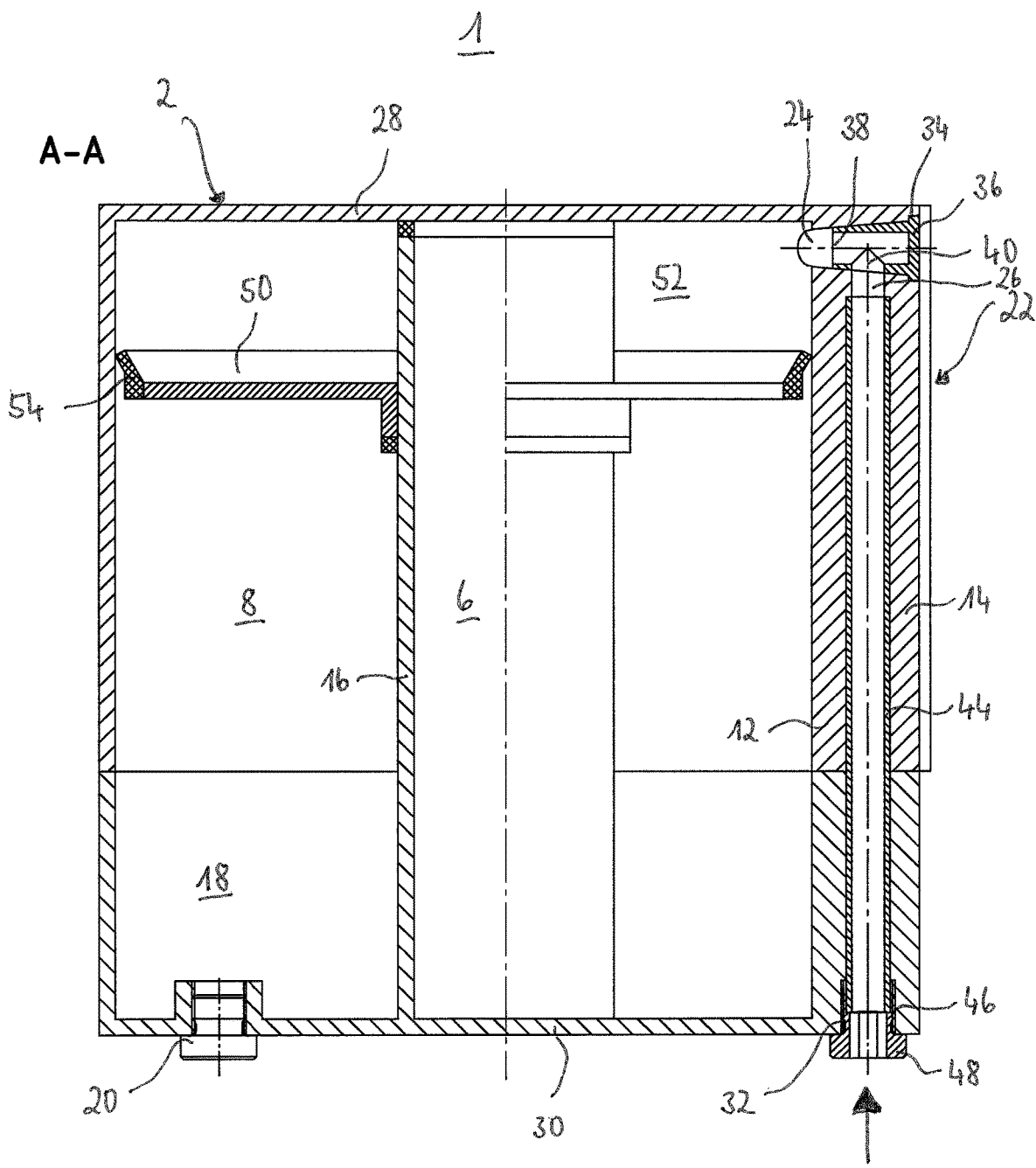
FIG. 6 is a sectional view through the housing of FIG. 4 in a second filling state.

FIGS. 4 to 6 show a different type of lubricant pump, wherein in the following the differences to the housing depicted in FIGS. 1 to 3 are primarily addressed. Here all features described with respect to FIGS. 1 to 3 also apply equally for the lubricant supply device in this exemplary embodiment.

In contrast to the housing depicted in FIGS. 1 to 3, in the housing 2 depicted in FIGS. 4 to 6, the filling does not occur from above, but rather from below via a filling nozzle 20 disposed in the base wall 30 (see also arrows in FIGS. 2, 3 and 5, 6). The fluidic connection to the storage space 8 is not shown in the schematic depiction. In addition, this type of lubricant pump includes a so-called follower plate 50 that separates the lubricant storage space 8 from an air space 52 disposed thereon. This follower plate 50 lies on the lubricant that is contained in the lubricant storage space 8 and follows the level of the lubricant. This is depicted in particular in FIGS. 5 and 6, wherein a completely filled lubricant pump is shown in FIG. 5, while FIG. 6 represents a situation wherein a certain proportion of the lubricant is already pumped out.

Furthermore, FIGS. 4 to 6 in turn show the double-walled structure made of a side wall 12 and an outer wall 14 that are equally equipped with a venting device 22, wherein the first opening 24 fluidically connects the intermediate space 26 to the storage space 8. Also in the exemplary embodiments depicted in FIGS. 4 to 6, the venting device 22 offers a double function during the filling; on the one hand it allows air to escape from the air space 52 so that an overpressure in the container is prevented, and on the other hand it makes possible the escape of lubricant in the event of an overfilling. For this purpose the opening 24 is disposed on the container such that in the uppermost position of the follower plate 50, a seal 54 disposed on the edge of the follower plate 50 uncovers the first opening 24 so that the intermediate space 26 is fluidically connected to the lubricant storage space 8 via the first opening 24. Lubricant can thereby be transferred from the lubricant storage space 8 and the opening 24 into the intermediate space 26 so that an overfilling is precluded.

In contrast, in normal operation (see FIG. 6) the venting device makes possible an inflow of air via the intermediate space 26 into the air space 52. Thus in contrast to FIGS. 2 and 3, in the exemplary embodiment depicted in FIGS. 5 and 6 a fluidic connection is provided via the closure element 36 between the second closure element opening 40 and the intermediate space 24 in all operating states, wherein the closure element 36 basically remains in the position wherein the second closure element opening 40 fluidically connects the intermediate space 26.

With respect to the other elements shown in the Figures, reference is made to the description of FIGS. 1 to 3.

Overall, a venting or over-filling protection can be provided using the lubricant pump presented here, which is simple to configure and cannot be damaged and not installed on the outside.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved lubricant pumps.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Lubricant supply device
2 Housing
4 Flange
6 Motor receiving space
8 Storage space for lubricant
12a, b Side wall
14a, b Outer wall
16 Motor space separation
18 Pump space
20 Filling nozzle
22 Venting device
24 First opening
26, 26a, 26b Intermediate space
28, 28a, 28b Cover wall
30, 30a, 30b Base wall
32 Opening in base wall
34 Opening in outer wall
36 Closure element
38 First closure-element opening
40 Second closure-element opening
42 Closure-element wall
44 Tubular element
46 Attachment structure
48 Attachment structure
50 Follower plate
52 Air space
54 Seal

What is claimed is:

1. A housing for a lubricant supply device for supplying a consumer with a lubricant, the housing comprising:
a storage space for the lubricant; and,
a pump space configured to contain a conveying pump for pumping the lubricant from the storage space to a medium outlet,
wherein the storage space is at least partially defined by an inner surface of a side wall, a base wall and a cover wall,
wherein the housing includes an outer wall overlying a portion of an outer surface of the storage space side wall and defining with the outer surface of the storage space side wall a first intermediate space, and
wherein the storage space side wall includes a passage from the inner surface of the side wall to the outer surface of the side wall providing fluid communication between the storage space and the first intermediate space.

2. The housing according to claim 1, wherein the first intermediate space is at least partially defined by the cover wall and/or the base wall.

3. A lubricant supply device for supplying a consumer with a lubricant and including the housing according to claim 1.

4. A housing for a lubricant supply device for supplying a consumer with a lubricant, the housing comprising:
a storage space for the lubricant and,
a pump space configured to contain a conveying pump for pumping the lubricant from the storage space to a medium outlet,
wherein the storage space is at least partially defined by a side wall, a base wall and a cover wall,
wherein the housing includes an outer wall overlying a portion of the storage space side wall and defining with the storage space side wall a first intermediate space,
wherein the storage space side wall includes a first opening providing fluid communication between the storage space and the first intermediate space,
wherein the pump space is at least partially defined by a side wall, a base wall and a cover wall,
including an outer wall overlying a portion of the pump space side wall and defining with the pump space side wall a second intermediate space, and
wherein the pump space and the storage space are disposed with respect to each other such that the first intermediate space and the second intermediate space are in fluid communication with one another.

5. The housing according to claim 4,
wherein the second intermediate space is at least partially closed by the pump space cover wall or the pump space base wall.

6. The housing according to claim 4,
wherein the storage space side wall and the pump space side wall comprise two portions of a single side wall, and the storage space outer wall and the pump space outer wall comprise two portions of a single outer wall, and
wherein the first intermediate space and the second intermediate space are two portions of a single intermediate space.

7. The housing according to claim 6, wherein the single intermediate space is at least partially closed by the storage space cover wall and/or the pump space base wall.

8. The housing according to claim 4, wherein a lower portion of the storage space base wall forms the pump space cover wall.

9. The housing according to claim 4,
including a second opening placing the single intermediate space in fluid communication with an environment outside the housing.

10. The housing according to claim 9, wherein the second opening is formed in the base wall of the pump space.

11. The housing according to claim 10,
including a tube removably mounted in the single intermediate space connecting the first opening to the second opening.

12. The housing according to claim 11, wherein the second opening includes a screw thread configured to engage a complementary screw thread on the tube.

13. The housing according to claim 9,
including a third opening in the storage space outer wall aligned with the first opening.

14. The housing according to claim 13,
including a closure element in the third opening configured to seal the third opening.

15. The housing according to claim 14,
wherein the closure element includes an internal passage having a first end in fluid communication with the first opening and a second end,
wherein the closure element is shiftable from a first position in which the second end is in fluid communication with the single intermediate space and a second position in which the second end is blocked.

16. The housing according to claim 15, wherein the closure element is rotatably mounted in the third opening.

17. A housing for a lubricant supply device for supplying a consumer with a lubricant, the housing comprising:
- a cylindrical side wall surrounding a storage space and a pump space, the side wall having an inner surface, an outer surface, a top end and a bottom end,
- a cover at the top end,
- a base wall at the bottom end,
- an outer wall overlying a portion of the outer surface of the side wall and radially spaced from the outer surface of the side wall and defining with the outer surface of the side wall an intermediate space,
- a passage in the side wall extending from the inner surface of the side wall to the outer surface of the side wall and fluidically connecting the storage space to the intermediate space, and
- an opening connecting the intermediate space to an environment outside the lubricant supply device,
- wherein the cover overlies a top end of the intermediate space and the base wall lies under a bottom end of the intermediate space.

18. The housing according to claim 17,
including a valve in the passage shiftable between a first position blocking the passage and a second position providing a path from the storage space to the intermediate space.

19. The housing according to claim 18,
including a tube removably mounted in the intermediate space connecting an output of the valve to the opening.

20. The housing according to claim 19,
wherein a first portion of the intermediate space is radially adjacent to the storage space and a second portion of the intermediate space is radially adjacent to the pump space.

* * * * *